(12) United States Patent
Hassan et al.

(10) Patent No.: US 8,078,990 B2
(45) Date of Patent: Dec. 13, 2011

(54) SECURE DEVICE SHARING

(75) Inventors: Ahmed E. Hassan, Waterloo (CA); John F. Wilson, Waterloo (CA); Daryl Joseph Martin, Paradise (CA)

(73) Assignee: Research In Motion Limited, Waterloo (CA)

( * ) Notice: Subject to any disclaimer, the term of this patent is extended or adjusted under 35 U.S.C. 154(b) by 1088 days.

(21) Appl. No.: 11/344,072

(22) Filed: Feb. 1, 2006

(65) Prior Publication Data
US 2007/0180492 A1 Aug. 2, 2007

(51) Int. Cl.
G06F 3/048 (2006.01)
G06F 7/04 (2006.01)

(52) U.S. Cl. ............................. 715/804; 726/2
(58) Field of Classification Search ................ 726/2, 28; 718/108
See application file for complete search history.

(56) References Cited

U.S. PATENT DOCUMENTS

| | | | |
|---|---|---|---|
| 6,097,385 A * | 8/2000 | Robinson | 715/718 |
| 6,351,817 B1 * | 2/2002 | Flyntz | 726/4 |
| 6,993,556 B1 * | 1/2006 | Seliger et al. | 709/203 |
| 7,137,126 B1 * | 11/2006 | Coffman et al. | 719/328 |
| 7,194,631 B2 * | 3/2007 | Numano | 713/183 |
| 7,657,849 B2 * | 2/2010 | Chaudhri et al. | 715/863 |
| 7,721,281 B1 * | 5/2010 | Cherepov et al. | 717/174 |
| 2003/0069919 A1 * | 4/2003 | Takahashi et al. | 709/108 |
| 2003/0105686 A1 * | 6/2003 | Dang et al. | 705/31 |
| 2004/0085351 A1 * | 5/2004 | Tokkonen | 345/741 |
| 2004/0088588 A1 * | 5/2004 | Awada et al. | 713/202 |
| 2004/0236508 A1 | 11/2004 | Ogasawara | |
| 2005/0097563 A1 | 5/2005 | Bidet et al. | |
| 2007/0150630 A1 * | 6/2007 | Armstrong et al. | 710/200 |
| 2007/0209063 A1 * | 9/2007 | Ohto | 726/4 |

FOREIGN PATENT DOCUMENTS

| | | |
|---|---|---|
| EP | 0713168 | 5/1996 |
| WO | WO0127724 | 4/2001 |
| WO | WO 02/103498 | 12/2002 |

OTHER PUBLICATIONS

Sheldon, Tom. Encyclopdia of Networkings & Telecommunications. "API". McGraw-Hilll. (2001). p. 43: Para 6.*
Extended European Search Report dated Dec. 17, 2009.
"Linuk in a Nutshell", A Desktop Quick Reference, Fourth Edition, Ellen Siever, et al., Jun. 2003, pp. 423-424.
"Sudo Manual", from the Internet, 'http://web.archive.org/web/20040820021800/http://www.courtesan.com/sudo/man/sudo.html', Aug. 20, 2004, pp. 1-8.

* cited by examiner

*Primary Examiner* — Nathan Flynn
*Assistant Examiner* — Abdullah Almamun
(74) *Attorney, Agent, or Firm* — Ridout & Maybee LLP

(57) ABSTRACT

A device and method for placing the device in a locked state having an associated set of permitted tasks so as to permit the device owner to share the device with others but maintain security over aspects of the device. A task change request is evaluated to determine whether the requested task is permitted and, if so, the requested task is allowed; if not, then an authorization process is invoked to prompt the user to input authorization data. Upon verification of the authorization data, the device may be unlocked and the requested change implemented. The permitted tasks may designate specific applications, specific operations or functions within applications or at the operating system level, one or more currently open windows, and other levels of granularity.

28 Claims, 6 Drawing Sheets

SECURE DEVICE SHARING

FIELD OF THE APPLICATION

The present application relates to electronic user-interactive devices and, in particular, to methods and systems for enabling sharing of such devices with other users without compromising security.

BACKGROUND

Security is an issue with most sophisticated electronic devices, especially handheld or mobile devices. Over time, these devices have begun to offer greater levels of functionality and a wider range of applications, including gaming, voice call capability, e-mail, instant messaging, and document creation. This has led to a greater desire to share the devices with others for limited purposes. For example, a device owner may only wish to share the device with colleagues for the purpose of allowing them to view a particular e-mail message. As another example, the device owner may only wish to share the device with children for the purpose of gaming without allowing them access to e-mail or other messaging applications. In yet another example, the device owner may wish to share the device with a colleague to make a voice call without allowing access to e-mail or other applications.

Accordingly, it would be advantageous to provide a method or mechanism to facilitate sharing of a device without compromising security.

BRIEF DESCRIPTION OF THE DRAWINGS

Reference will now be made, by way of example, to the accompanying drawings which show an embodiment of the present application, and in which.

Similar reference numerals are used in different figures to denote similar components.

DESCRIPTION OF SPECIFIC EMBODIMENTS

Figure 1:
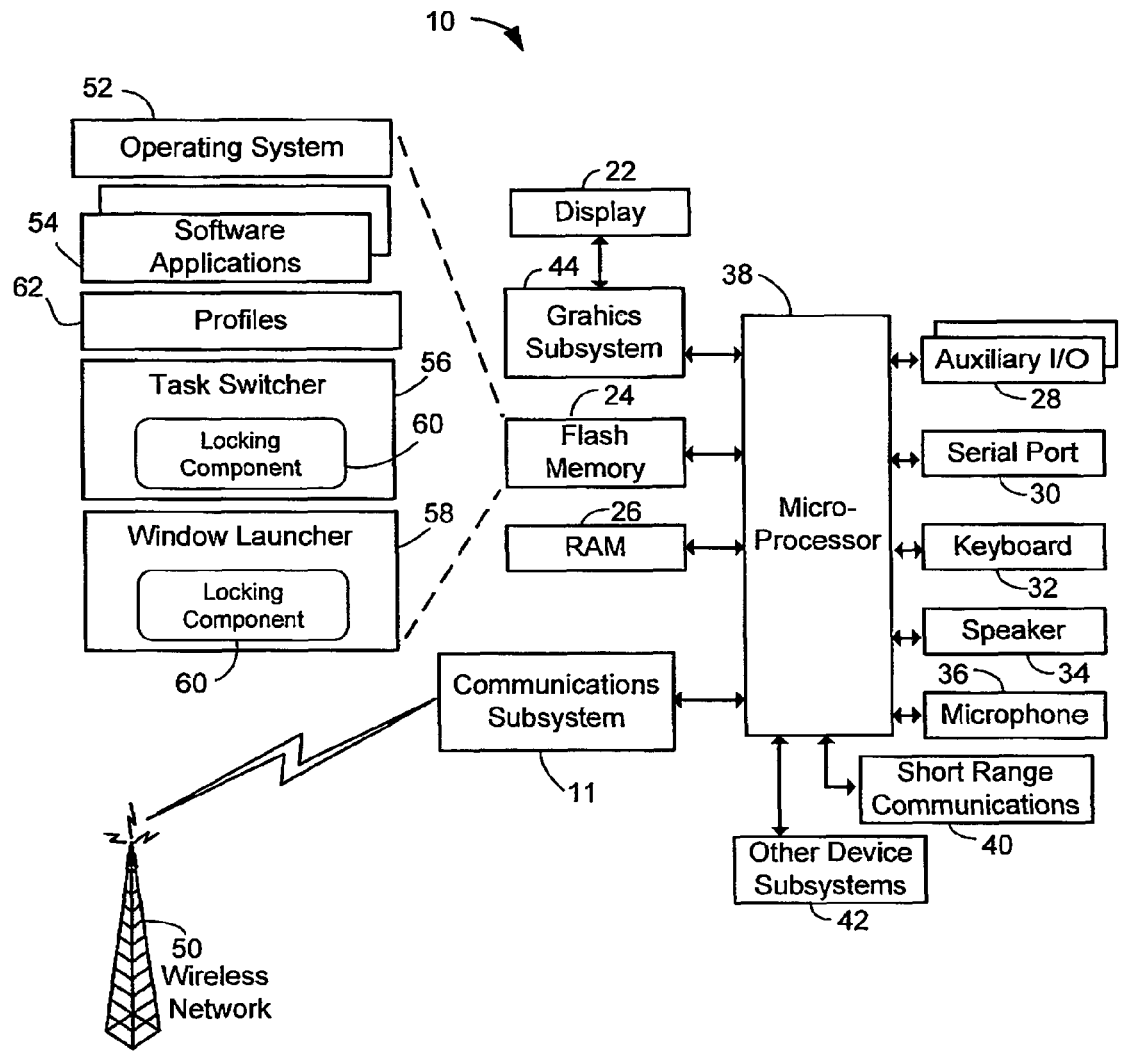
FIG. 1 shows a block diagram of an embodiment of a mobile device having sharing security.

The present application provides a device and a method for placing a device in a locked state having an associated set of permitted tasks so as to permit the device owner to share the device with others but maintain security over aspects of the device. The user of a locked device may only perform tasks that are permitted without unlocking the device. A task change request is evaluated to determine whether the requested task is permitted and, if not, then an authorization window is opened to prompt the user to input authorization data. Upon verification of the authorization data, the device may be unlocked and the requested change executed. The permitted tasks may designate specific applications, specific operations or functions within applications or at the operating system level, one or more currently open windows, or other levels of granularity. Task change API calls by a task changer, such as a task switcher or window launcher, may be evaluated by a process control level of the operating system to determine whether the requested task change is permitted. If the task is not permitted, then the API call may be failed and the task changer may re-call the task change API supplemented with an argument containing the authorization data input by the user.

In one aspect, the present application provides a method of securing an electronic device to enable a user to share the device with another person. The device has an operating system and the device is placed in a locked state. The locked state is associated with permitted task information. The method includes steps of receiving a user request to activate a selected task, identifying the locked state of the device, and determining whether the selected task is permitted based upon the permitted task information and, if so, activating the selected task.

In another aspect the present application provides an electronic device. The device has a locked state and an unlocked state. The locked state is associated with permitted task information. The device includes a main body having a user input device, a display, memory, and a processor operatively coupled to the user input device, the display and the memory. It also includes an operating system running on the processor for managing input and output through the user input device and the display and providing a platform for operation of application programs. The operating system is configured to receive a user request to change to a selected task. The device also includes a task request component for identifying that the device is in the locked state and for determining whether the selected task is permitted based upon the permitted task information and, if so, activating the selected task.

In another aspect, the present application describes a method of securing an electronic device to enable a user to share the device with another person. The device has an operating system. The method includes the steps of receiving a request to lock the device, setting a lock indicator to establish the locked state of the device, and associating permitted task information with a locked state of the device. The method also includes steps of receiving a user request to activate a selected task, identifying the locked state of the device, and reading the permitted task information and determining whether the selected task is permitted based upon the permitted task information and, if so, activating the selected task.

In yet another aspect, the present application provides an electronic device. The device has a locked state and an unlocked state. The device includes a main body housing a user input device, a display, memory, and a processor operatively coupled to the user input device, the display and the memory. The device also includes an operating system running on the processor for managing input and output through the user input device and the display and providing a platform for operation of application programs, wherein the operating system is configured to receive a user request to change to a selected task. Also includes in the device are a locking component for receiving a request to lock the device, setting a lock indicator to establish the locked state of the device, and associating permitted task information with the locked state of the device, and a task request component for identifying that the device is in the locked state and for determining whether the selected task is permitted based upon the permitted task information and, if so, activating the selected task.

In yet a further aspect, the present application provides a computer program product for securing an electronic device to enable a user to share the device with another person. The computer program product includes a computer-readable medium having recorded thereon computer executable instructions. The electronic device has an operating system, and the computer executable instructions include computer executable instructions for receiving a request to lock the device, computer executable instructions for setting a lock indicator to establish the locked state of the device, and computer executable instructions for associating permitted task information with a locked state of the device. The computer executable instructions also include computer executable instructions for receiving a user request to activate a selected task, computer executable instructions for identifying the locked state of the device, and computer executable instructions for reading the permitted task information and determining whether the selected task is permitted based upon the permitted task information and, if so, activating the selected task.

Other aspects and features of the present application will be apparent to those of ordinary skill in the art from a review of the following detailed description when considered in conjunction with the drawings.

The following description of one or more specific embodiments does not limit the implementation to any particular computer programming language or system architecture. Moreover, the present application may be embodied within a variety of user devices, including mobile devices, handheld devices, mobile telephones, personal digital assistants (PDAs) and other such devices. In some embodiments, the present application may be implemented in stationary devices, like desktop computers. References herein to a "device" are meant to encompass all such possibilities.

Portions of the method and device described herein may be implemented in software. In this regard, the description below makes reference to many software elements that may be labeled as "modules", "components", etc. It will be appreciated that some of the described modules, components, programming objects, etc., or other software elements herein may in some cases be implemented together as a single module, component, application, subroutine, object, etc., or separately, and the precise implementation is a matter of design choice. It will also be appreciated that in many cases the described modules or components may be implemented within the operating system itself, but are shown separately for ease of discussion. References to a module or component or other software element are not intended to limit the nature of the computer programming implementation.

Those skilled in the art will appreciate that any references below to a "window" in a display or the opening of a "window" are meant in the generic sense of a task window in a graphical user interface and are not intended to imply any association with the Microsoft Corporation or with the Microsoft Windows™ operating system marketed by Microsoft Corporation. The present application is not intended to be limited to particular types of operating systems and in particular to any Microsoft Windows™ operating system.

Referring now to the drawings, FIG. 1 is a block diagram of an example embodiment of a user device 10. In the example embodiment, the user device is a two-way mobile communication device 10 having data and possibly also voice communication capabilities. In an example embodiment, the device 10 has the capability to communicate with other computer systems via a network. Depending on the functionality provided by the device 10, in various embodiments the device may be a data communication device, a multiple-mode communication device configured for both data and voice communication, a mobile telephone, a PDA enabled for wireless communication, or a computer system with a wireless modem, among other things.

In this embodiment, the device 10 includes a communication subsystem 11. In one embodiment, the communication subsystem 11 may include a receiver, a transmitter, and associated components such as one or more, preferably embedded or internal, antenna elements, and a processing module such as a digital signal processor (DSP). As will be apparent to those skilled in the field of communications, the particular design of the communication subsystem 11 will be dependent upon the communication network in which the device 10 is intended to operate.

Signals received by the device 10 from a wireless communication network 50 are input to the receiver of the communication subsystem 11, which may perform such common receiver functions as signal amplification, frequency downconversion, filtering, channel selection and the like. In a similar manner, signals to be transmitted are processed, including modulation and encoding for example, by the DSP and input to the transmitter for digital to analog conversion, frequency up conversion, filtering, amplification and transmission over the wireless communication network 50.

The device 10 includes a microprocessor 38 that controls the overall operation of the device. The microprocessor 38 interacts with the communications subsystem 11 and also interacts with further device subsystems such as a graphics subsystem 44, flash memory 24, random access memory (RAM) 26, auxiliary input/output (I/O) subsystems 28, serial port 30, keyboard or keypad 32, speaker 34, microphone 36, a short-range communications subsystem 40, and any other device subsystems generally designated as 42. The graphics subsystem 44 interacts with the display 22 and renders graphics or text upon the display 22.

Operating system software 52 and various software applications 54 used by the microprocessor 38 are, in one example embodiment, stored in a persistent store such as flash memory 24 or similar storage element. Those skilled in the art will appreciate that the operating system 52, software applications 54, or parts thereof, may be temporarily loaded into a volatile store such as RAM 26. It is contemplated that received communication signals may also be stored to RAM 26.

The microprocessor 38, in addition to its operating system functions, preferably enables execution of software applications 54 on the device. A predetermined set of software applications 54 which control basic device operations, including data and voice communication applications for example, will normally be installed on the device 10 during manufacture. Further software applications 54 may also be loaded onto the device 10 through the network 50, an auxiliary I/O subsystem 28, serial port 30, short-range communications subsystem 40 or any other suitable subsystem 42, and installed by a user in the RAM 26 or a non-volatile store for execution by the microprocessor 38.

In a data communication mode, a received signal such as a text message or Web page download will be processed by the communication subsystem 11 and input to the microprocessor 38, which will preferably further process the received signal for output to the display 22 through the graphics subsystem 44, or alternatively to an auxiliary I/O device 28. A user of device 10 may also compose data items within a software application 54, such as email messages for example, using the keyboard 32 in conjunction with the display 22 and possibly an auxiliary I/O device 28 such as, for example, a thumbwheel. Such composed items may then be transmitted over a communication network through the communication subsystem 11.

The serial port 30 in FIG. 1 would normally be implemented in a personal digital assistant (PDA)-type communication device for which synchronization with a users desktop computer (not shown) may be desirable, but is an optional device component. Such a port 30 would enable a user to set preferences through an external device or software application and would extend the capabilities of the device by providing for information or software downloads to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices. The device 10 may be a handheld device.

Wireless mobile network 50 is, in an example embodiment, a wireless packet data network, (e.g. Mobitex™ or DataTAC™), which provides radio coverage to mobile devices 10. Wireless mobile network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems).

The device 10 shown in FIG. 1 further includes a task change module or task changer for receiving a user request to change the active task. In one aspect, the task changer receives the user request to change the active task and initiates an operating system-level instruction to trigger the task change in response to the user request. Example embodiments of such a task change module include a task switcher 56 and a window launcher 58.

The task switcher 56 may respond to requests to change from one open task to another open task. In one example, the task switcher 56 may initiate changes in the active window shown on a display in response to user requests. For example, two application programs may be open in two separate windows within the display, an active window being layered on top of an inactive window. In another example, a single application program or multiple instances of a single application program may result in two or more open windows, only one of which is active at a given time. User input and interaction is with the active window and, therefore, its associated application is the active application. To change the active application or window, a user may initiate a task change request. By way of example, in a Microsoft Windows™ operating system environment, a task change may be requested through a mouse click upon a button on a task bar showing the available open windows. Alteratively, a user may change the active window by depressing the Alt-key and Tab-key at the same time. In another example, a user may initiate a task change by attempting to minimize, close or exit from a window, thereby switching the active window to the "next" open window (or the 'desktop' if no open windows remain).

The window launcher 58 responds to user requests to initiate a new task. In particular, in one embodiment the window launcher 58 initiates a new instance of an application program in response to a user request. The launch of a new instance of an application program results in the opening of a new window and the designation of the newly opened window as the active window in the display. The window launcher 58 may also be used by an active application program to start a new task. For example, within a word processing program a user request to open a new document or an existing document causes the launch of a new window. Similarly, within an e-mail messaging program, clicking on a message in an "inbox" view launches a new window for displaying the selected message. Within the displayed message, selection of a "reply" or "forward" button or menu item launches yet another window for composing the reply or forward message.

In another aspect, references to a task changer or task change module are intended to encompass the object or software element at an application level or operating system level for initiating instructions to execute an operation within a specific application. For example, in an e-mail application, a user may request a certain function like forwarding a message, replying to a message, opening a message, through an appropriate user input (like clicking on a designated icon). The task changer is the software object or element that responds to that user input to execute or implement the requested operation or task. The task changer typically calls an application programming interface (API) instruction to implement or execute the requested function.

The term "task change" or "task changer" as used herein is meant to encompass both a change in the active window as between two or more open windows, and the launch or opening of a new window. In some embodiments, it is also meant to encompass selection of a specific operation within an application, where the operation implements an application-specific feature.

The task switcher 56 and/or window launcher 58 may include a locking component 60. The locking component 60 enables a user to place the device in a locked state, thereby preventing task changes, or limiting the permitted task changes. For example, in one embodiment, in a locked state the user will be unable to change the active window or open a new window. In another embodiment, the user may be permitted to change the active window to other open windows, but may be prevented from launching new windows. In yet another embodiment, the locked state may be associated with a set of permitted tasks or a set of impermissible tasks, and the requested change may be evaluated to determine whether it is permitted.

In some embodiments, the device 10 may further include stored profile data 62. The profile data 62 may define the permitted and/or impermissible tasks associated with a locked state. In one embodiment, the profile data 62 may include permitted application programs. For example, the profile data 62 may list a phone application program and/or various games application programs but may not include an e-mail or messaging application, word processing applications, and/or systems-level applications such as control panel or uninstall facilities. In a locked state the user can only activate one of the permitted programs included in the profile data 62. Those skilled in the art will appreciate that rather than indicating permitted applications, the profile data 62 may indicate the impermissible applications.

In another embodiment, the profile data 62 may contain user profiles, where each user profile has an associated predefined set of permitted tasks or applications. For example, one profile may lock the user into a voice call application program. Another profile may only permit the user to activate games programs. Yet another profile may lock the device to the then-active window open on the device. This latter type of lock may be useful when reading an e-mail message opened in the active window, thereby allowing the user to scroll through the message, but preventing access to other e-mail messages on the device and/or preventing forwarding or replying to the e-mail message being viewed.

In yet another embodiment, the profile data 62 may include a dynamic list of permitted applications that may be selected by the user when locking the device 10. In this embodiment, the user has the ability to custom select the permitted applications and/or tasks for a particular locked state. For example, the locking component 60 may provide the user with a picklist of application programs from which to select one or more permitted applications and the user's selections may be stored in the profile data 62.

In yet a further embodiment, the profile data 62 may indicate permitted tasks within an application program. For example, within a voice call program the permitted tasks may include answering calls and initiating emergency calls, but may prevent initiating non-emergency voice calls or access to voicemail. In another example, within an e-mail application program the profile data 62 may permit opening messages, which may involve the opening of a new window, but may not permit the sending of messages or the moving of or deletion of messages. It will be appreciated that implementing an embodiment of the present application wherein permitted tasks may be specific to operations or functions within an application program may require that portions of the locking component 60 be implemented within the application program itself.

Figure 2:
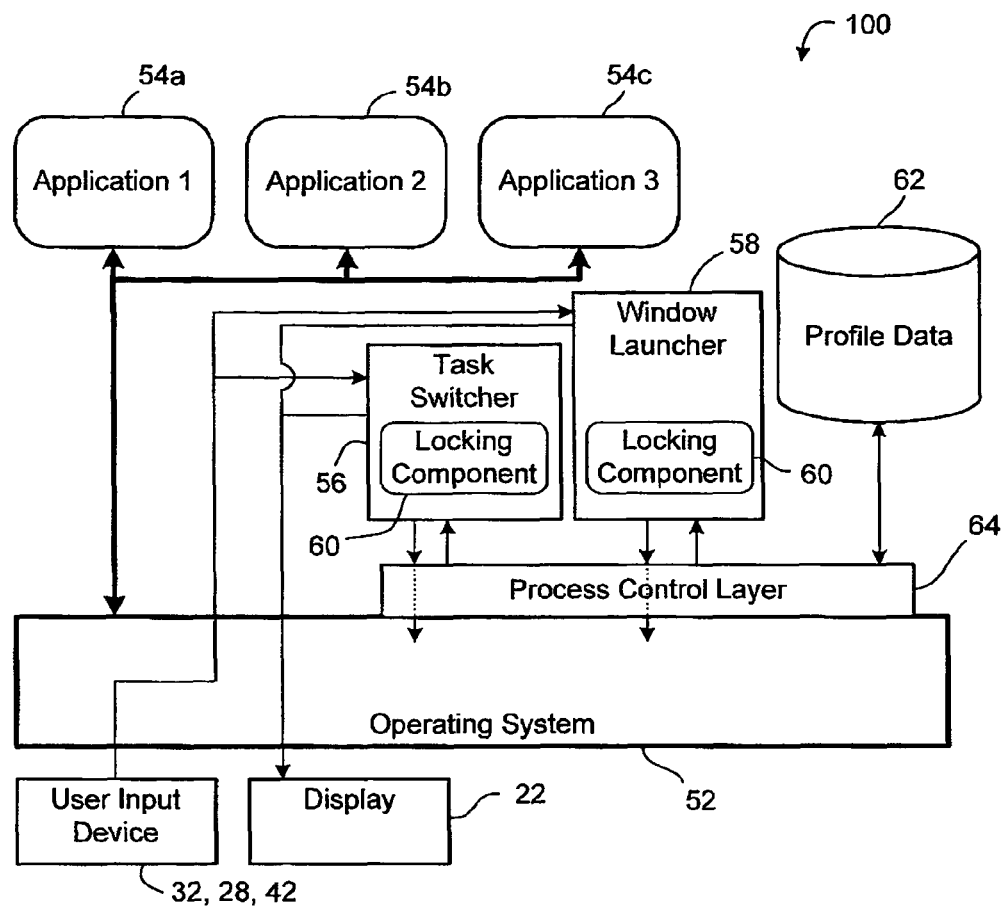
FIG. 2 shows, diagrammatically, architecture of one embodiment of a mobile device having sharing security.

Reference is now made to FIG. 2, which diagrammatically shows an architecture 100 of one embodiment of a mobile device providing for secure sharing. The architecture 100 includes the operating system 52 that serves as a platform for running the software applications 54 (shown individually as 54a, 54b, 54c). The operating system 52 also manages the receipt of input signals from user input devices such as the keyboard 32, auxiliary I/O ports 28, and/or other such device subsystems 42. It also manages the output of data to the display 22 for rendering windows and other display elements.

The architecture 100 may include the task switcher 56 and/or the window launcher 58. FIG. 2 shows the locking component 60 within each of the task switcher 56 and the window launcher 58, although it will be appreciated that this component may be implemented as a separate module or component.

The task switcher 56 and window launcher 58 may, in some situations, communicate with the operating system 52 through a process control layer 64. The process control layer 64 provides application programming interfaces (APIs) for directing the operating system 52 to implement task change operations. The process control layer 64 may further manage the lock state of the device 10 and enforce profile-related permissions while the device 10 is in a locked state. Accordingly, the process control layer 64 may read or query the profile data 62.

By way of example, a basic API call for changing the active window may take the form:

ActivateWindow(windowID)

where the windowID parameter specifies the window to be made active. In some contexts, the windowID parameter may refer to an application program and in some other contexts the windowID parameter may refer to a specific window out of two or more windows associated with an application program. The precise format and use of the API may be dependent upon the operating system, as will be appreciated by those skilled in the art.

The process control layer 64 may provide a lock-enabled API for requesting task changes while the device 10 is in a locked state. Such a lock-enabled API call may take the form:

ActivateWindow(windowID, password)

where the password argument is obtained by the locking component 60 from user input through the keyboard 32 or keypad.

The process control layer 64 may be configured to prevent the task switcher 56 and/or window launcher 58 from calling certain basic APIs in the event that the device 10 is in a locked state. If the device 10 is in a locked state, then the process control layer 64 may first determine whether the proposed task change is permitted or not by consulting the profile data 62. If the task is permitted, then the process control layer 64 may pass the API call to the operating system 52. If it is not permitted, the process control layer 64 may fail the API call, i.e. refuse the requested task change. The failure of the requested task change may prompt the locking component 60 to obtain user authorization to unlock the device 10 in order to allow the requested task change to occur. For example, the locking component 60 may then recognize the necessity of using a lock-enabled API for implementing the requested task change.

It will be appreciated that the process control layer 64 may need to watch for a number of API calls to determine whether they should be permitted while in a locked state. For example, a request to minimize a window (thereby possibly changing the active window), a request to close a window (and thereby change the active window), a request to launch an instance of a new application, and requests to open a new window within an active application are all possible API calls that may be monitored by the process control layer 64.

Figure 3:
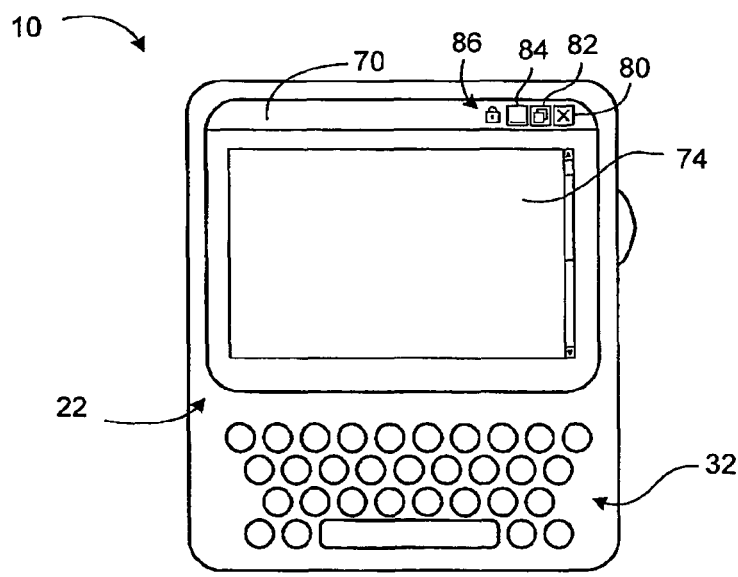
FIG. 3 shows a front view of the display of one embodiment of a mobile device having sharing security.

A front view of the display 22 of one embodiment of the mobile device 10 having sharing security is shown in FIG. 3. The display 22 is filled with an active window that includes a header 70 or status bar situated at the top of the window. The window may include a scrollable portion 74. The header 70 may include an exit or close button 80 for closing out the window, a toggle button 82 to alternate between the full view shown and a tiled view in which the window only occupies a portion of the display 22, and a minimize button 84 for shrinking the current window and bringing another window forward as the active window. In one embodiment, the header 70 may further include a lock indicator 86 to indicate that the device 10 is in a locked state. In yet another embodiment, a user may click upon the lock indicator 86 to trigger the locking component 60 to bring up a user authorization window for unlocking the device 10 or altering the profile data 62.

Figure 4:
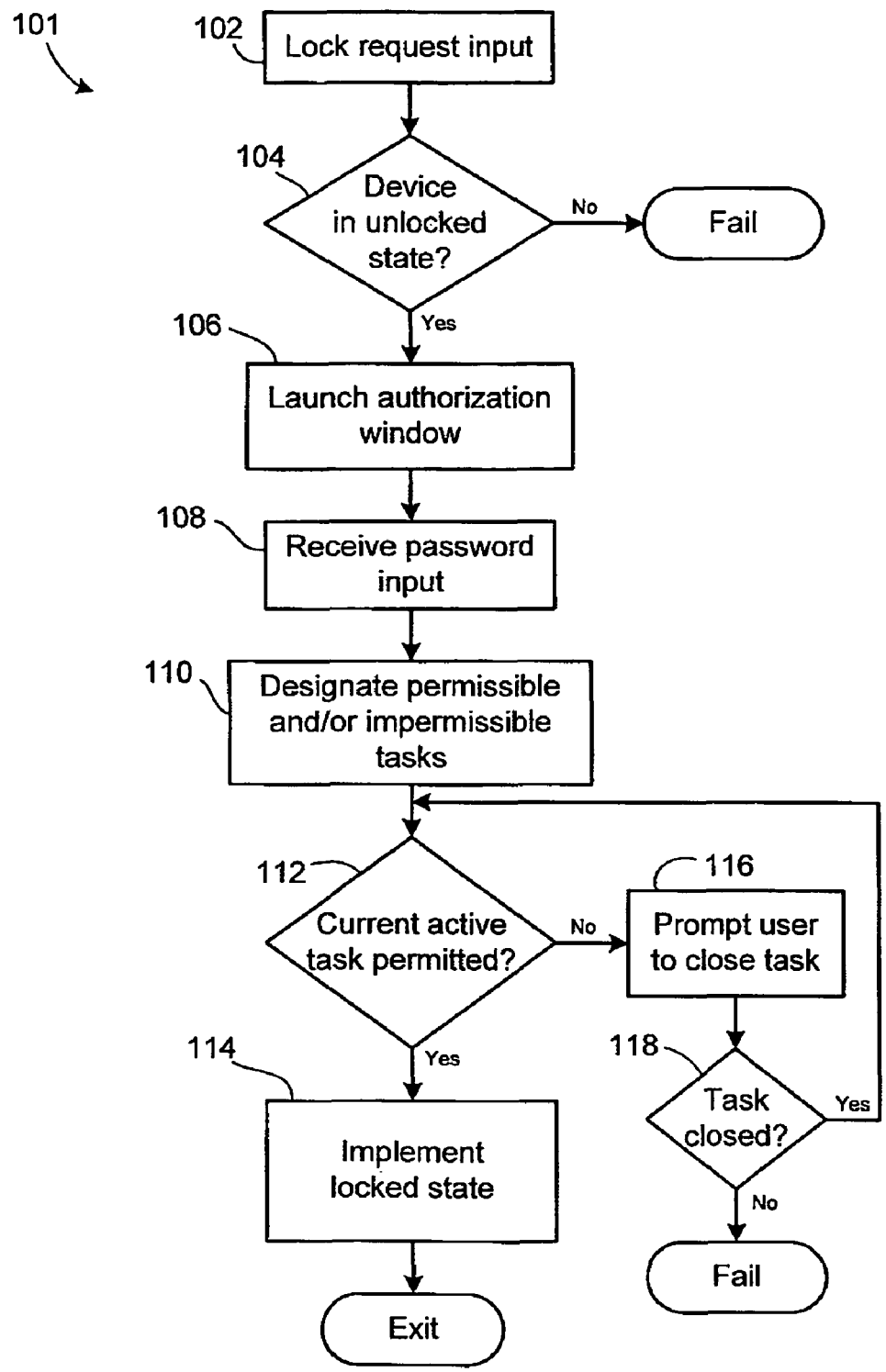
FIG. 4 shows, in flowchart form, one embodiment of a method of locking a mobile device for sharing purposes.

Reference is now made to FIG. 4, which shows, in flowchart form, an embodiment of a method 101 for locking a device for sharing purposes. The method 101 begins in step 102 with the receipt of a lock request. The lock request input may come from the user through the selection of a lock option on a pull-down menu, a key combination, clicking a lock icon, or in any other manner in which the user may input a lock request.

In step 104, upon receipt of the lock request, the locking component 60 (FIG. 2) determines whether the device is already in a locked state. This may be indicated by a flag or other mechanism that the locking component 60 may check. In some embodiments, the locking component 60 may query the process control layer 64 as to the state of the device.

If the device is already in a locked state, then the lock request is failed. If the device is in an unlocked state, then the method 101 continues to step 106. At step 106, the locking component 60 launches an authorization window. Through the authorization window, the locking component 60 receives password input, as indicated in step 108. The authorization window may prompt the user to input a password. The password may be requested twice to confirm accuracy if the password is being established for the first time instead of being compared against an existing password. Although not shown in FIG. 4, in some embodiments the password must match an existing password stored in memory on the device and associated with an authorized user of the device. In such an embodiment, an incorrect password may fail the operation and the method 101 may be discontinued.

In step 110, the user may designate permissible and/or impermissible tasks associated with the locked state. In one embodiment, this designation is automated and the user does not actively select the permitted tasks. In another embodiment, the user selects a "lock profile", wherein each lock profile has an associated set of permissible tasks. An example lock profile may be "friend" profile that allows access to games, Internet browser, voice call applications, etc., but blocks the user from applications such as instant messaging, e-mail, and/or systems applications. In yet another embodiment, the user selects individual applications or tasks that the user wishes to permit while locked. In this latter case, the selected applications or tasks may be stored as a current profile or current permitted tasks within the profile data 62.

In step 112, based upon the permitted tasks established in step 110, the device evaluates whether the current active task or application is a permitted task or application. If not, then in step 116, the user is prompted to close the task or application prior to locking the device. If the user elects not to close the impermissible task, then step 118 cancels the lock request and exits the method 101. Otherwise, step 118 leads back to step 112 once the task is closed to evaluate whether the new current active task (if any) is a permitted task. It will be appreciated that in some embodiments the method 101 may include an automated maximizing of the current active task so that the window associated with the current active task fills the display 22, thereby preventing unauthorized reading of any windows that may be tiled underneath the active window and which may not be permitted tasks. The maximization of window size may occur in step 110 or following step 112, or elsewhere in the method 101.

Assuming that the current active task, if any, is a permitted task, then the method 101 continues in step 114, wherein the device is placed in a locked state. This may, in some embodiments, involve instructing the process control layer 64 to lock the device 10, which may include setting a lock flag or other indicator.

Figure 5:
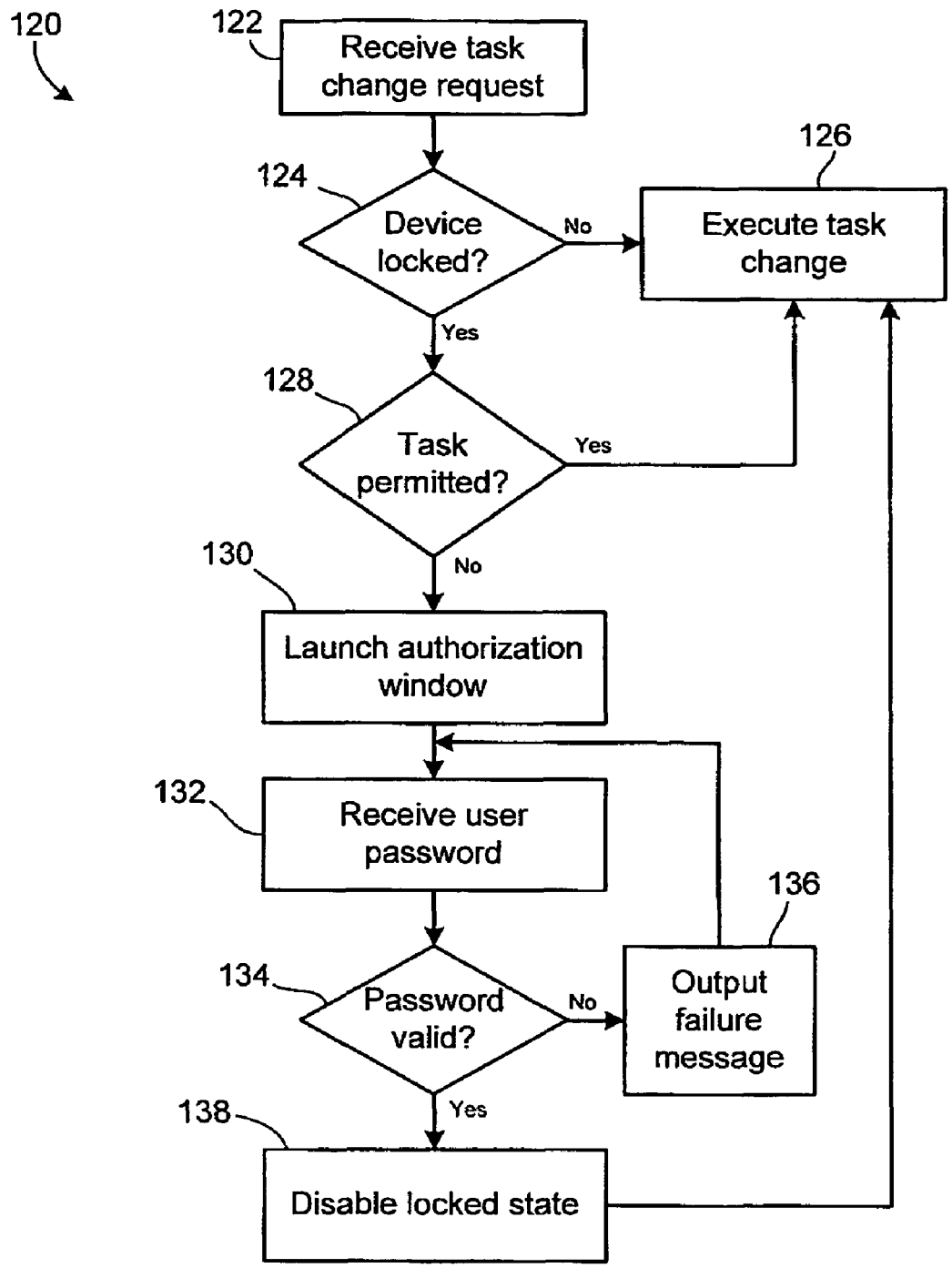
FIG. 5 shows, in flowchart form, one embodiment of a method of switching tasks on a locked mobile device.

Reference is now made to FIG. 5, which shows, in flowchart form, an embodiment of a method 120 for managing task change requests in a locked device. The method 120 begins with the receipt of a task change request in step 122. The task change request may come from a variety of sources, as discussed above. For example, the user may attempt to launch a new application from a start menu or icon. The user may also attempt to open a new window by selecting an operation within an application that results in the launch of a new window. In yet another example, the user may attempt to switch between two open windows, thereby changing the active window. This latter circumstance may arise from a key combination, like Alt-Tab, selecting the other window from a menu or task bar, or minimizing or closing the current active window. Other circumstances that may give rise to receipt of a task change request will be understood by those of ordinary skill in the art.

In step 124, the device evaluates whether it is in a locked state. If not, then the device implements the task change at step 126. If the device is in a locked state, then in step 128 the requested task change is evaluated to determine whether it is a permitted task. If the task change is a permitted task, then the method 120 proceeds to step 126 to implement the requested task change.

If the task is not permitted, then at step 130 an authorization window is displayed to the user. The authorization window may prompt the user to input a password or other authorization data. In some embodiments, the user may be required to input biometric data, such as a fingerprint, retinal scan, voice sample, or other such data, through an appropriate I/O device. At step 132, the device receives the input data, such as a password, and at step 134 the input data is validated. This step may involve comparing the input data with stored authorization data, such as a password. If the input data is not validated, then in step 136 a failure message or signal may be output and the user may be prompted to re-attempt his or her input. Accordingly, the method may return to step 132 (or, alternatively, step 130). If the user is unable to input a valid password or other authorization data, then the user may cancel the task change request and exit the method 120. In some embodiments, the user may be limited to a maximum number of attempts, and the device may have a lock-down or erasure policy associated with more than the maximum number of unsuccessful attempts to unlock the device, as will be understood by those skilled in the art.

If the data is validated in step 134, then the method 120 proceeds to step 138, whereupon the device is unlocked. In some embodiments, unlocking the device may involve resetting a flag or other lock indicator. The method 120 then proceeds to step 126 where the requested change is implemented.

In another embodiment, step 138 does not involve disabling the locked state of the device. One possibility is that the successful validation of the input data in step 134 leads to a one-time authorization of the operation or task change, despite the locked state. It will be appreciated that any subsequent attempt to change from a permitted task to this requested task will necessitate re-authorization. Another possibility is that the successful validation of the input data in step 134 may lead to a modification to the permitted tasks stored in the profile data. The user may be presented with a dialog box or window that asks whether the user would like to make the requested task one of the permitted tasks for the locked state. If the locked state is associated with a specific user profile, then the user profile may be updated to add the requested task as a permitted task. Other possibilities will be apparent to those of ordinary skill in the art.

Figure 6:
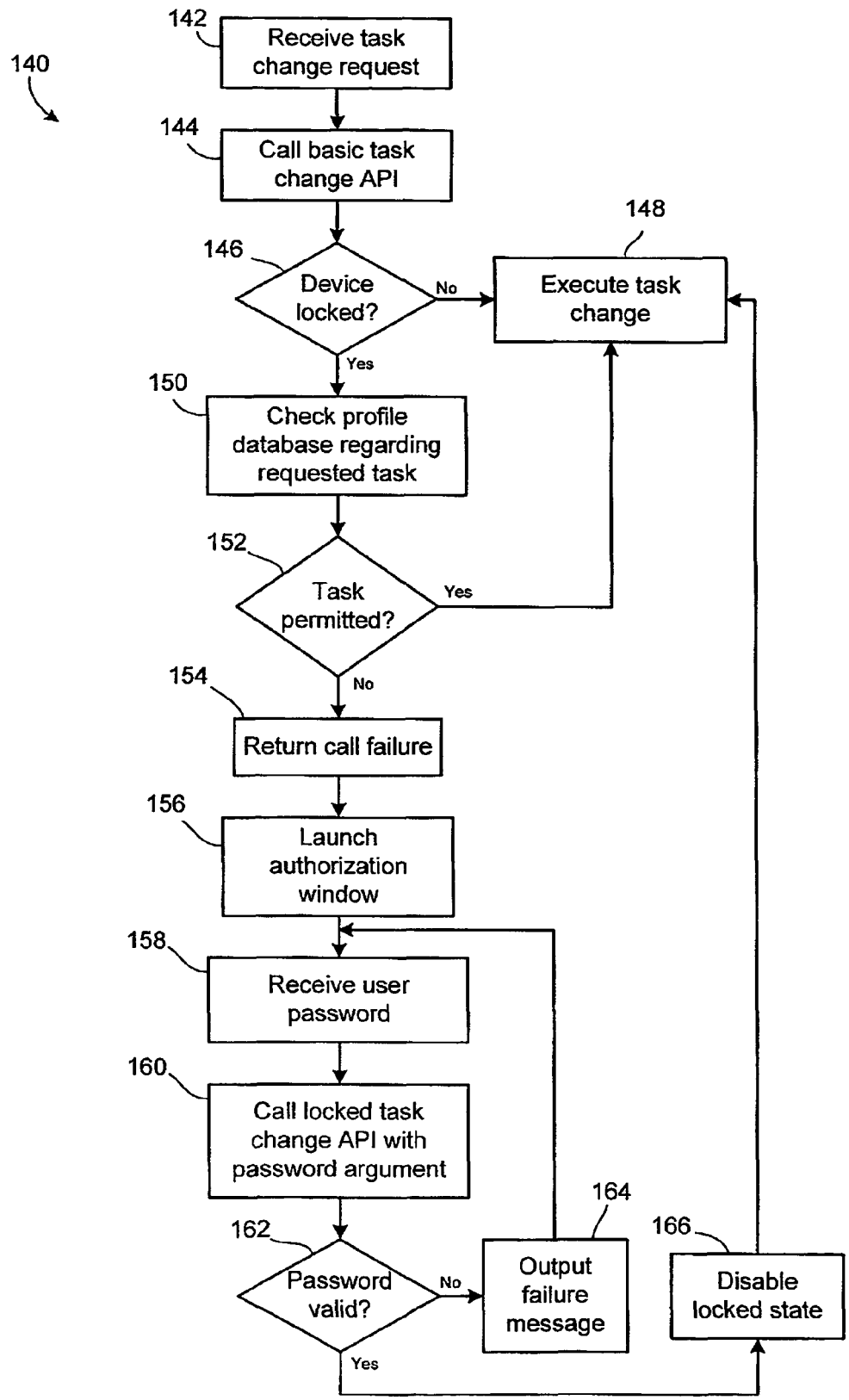
FIG. 6 shows, in flowchart form, a further embodiment of a method of switching tasks on a locked mobile device.

Reference is now made to FIG. 6, which shows, in flowchart form, an embodiment of a method 140 of managing task change requests in a locked device. The task change request is received in step 142. The task change request may be handled by the task changer, which may in some embodiments include the task switcher 56 (FIG. 2) and/or the window launcher 58 (FIG. 2). Either of these modules may call an API to instruct the operating system 52 (FIG. 2) to change the task as shown in step 144. This task change API call may be initially evaluated by the process control layer 64 (FIG. 2), at step 146. The process control layer 64 assesses whether the device is locked in step 146. If not, then it passes the task change request to the operating system 52 for implementation, as shown in step 148.

If the device is found to be locked in step 146, for example by checking a flag or other lock indicator, then in step 150 the process control layer 64 checks the profile data 62 (FIG. 2) to determine whether the requested task change is a permitted task change. This evaluation as to whether the task is permitted, as shown in step 152, may be based upon the identity of the application program requested, the type of task or operation being performed, or other factors. If the task is found to be permissible, then the method 140 continues to step 148, whereupon the task change API call is passed through to the operating system 52 for implementation of the requested change.

If the task is impermissible, then in step 152 the process control layer 64 may return a call failure message to the task switcher 56 or window launcher 58, as the case may be. The call failure message may be recognized by the locking component 60 (FIG. 2) as an indication that the device is locked and that the requested task change is impermissible according to the profile data 62 associated with the current lock state. Accordingly, in step 156, the locking component 60 launches an authorization window to prompt the user to provide input authorization data, such as a password. Through the authorization window, the locking component 60 receives user input in step 158. As noted above, in some cases, the input may be biometric. In many embodiments, the user input may be a password string.

In step 160, the task switcher 56 or window launcher 58 re-requests the task change, but in this instance the request includes the input authorization data obtained in step 158. For example, the task change API may include the authorization (e.g. password) data as an argument in the call. This API call having password data is received by the process control layer 64 in step 160 and the password argument is evaluated to determine whether it is valid. If the password is validated, then in step 164 the lock state may be disabled and the method 140 proceeds to step 148 to implement the requested task change. Otherwise, a password failure message may be displayed in step 162 and the user may be given another opportunity to input the password in step 160. Those skilled in the art will appreciated that certain limits may be imposed upon the number of attempts to enter a correct password.

Figure 7:
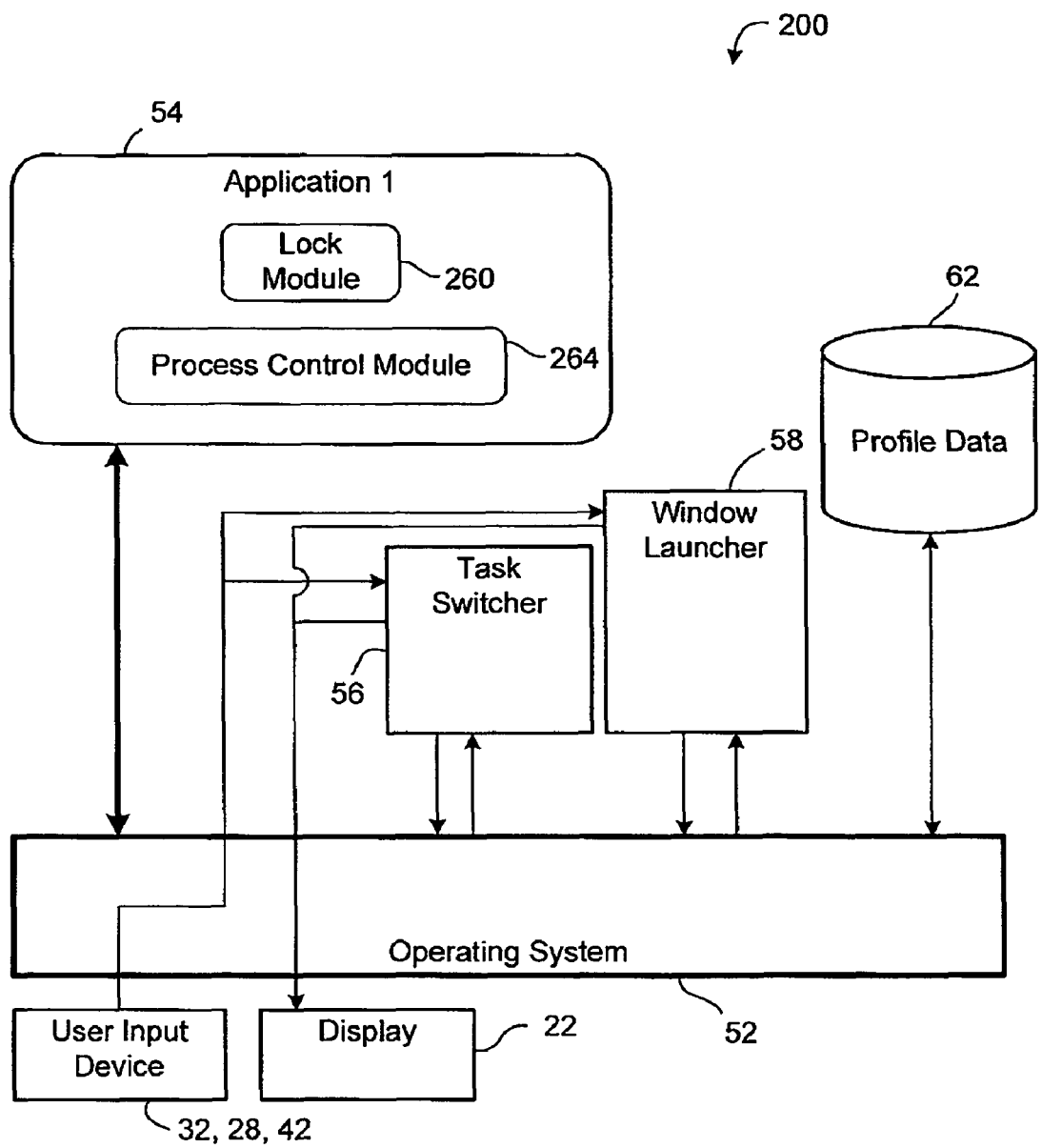
FIG. 7 shows, diagrammatically, architecture of a further embodiment of a mobile device having sharing security.

Reference is now made to FIG. 7, which diagrammatically shows an architecture 200 of one embodiment of a mobile device providing for secure sharing. This embodiment provides for application-feature-specific secure sharing through implementation of some or all aspects of the secure sharing within a specific application, i.e. at the application level. Those skilled in the art will appreciate that this embodiment involves implementation within the application itself, and therefore involves coding and re-compiling of the application program; whereas the above-described embodiments were application-independent and were implemented at the operating system level. By way of non-limiting example, the application 54 may be an e-mail application program.

The application 54 includes a lock module 260 for managing user interface with the locking operation. For example, the lock module 260 may generate a user authorization interface for receiving user password input, as described above.

The application 54 also includes a process control module 264 for recognizing the state of the device as locked or unlocked and for enforcing the lock restrictions with respect to specific tasks or operations. The profile data 62, which may be loaded into RAM memory or stored in permanent memory, may contain a set of permitted or impermissible tasks or operations. As discussed in greater detail above, the set of permitted or impermissible tasks or operations may be associated with pre-defined user profiles or may be specified by the authorized user during the locking process.

In one example embodiment, the application 54 is an e-mail application program. The impermissible tasks or operations may include, for example, forwarding, replying to, composing, opening, deleting, moving, or otherwise dealing with messages. In will be appreciated that these impermissible operations or tasks may not necessarily require the opening of a new window on the display, so the task switcher 56 or window launcher 58 may not necessarily be involved in executing the operation.

The user may request or initiate the operation or task by selecting a menu item, clicking an icon associated with the operation, or otherwise providing user input to trigger the operation. In one embodiment, the API for executing the requested operation is customized to call a lock verification API, which causes the process control module 264 to evaluate the lock state of the device, the requested operation, and the permitted or impermissible tasks to determine whether to authorize the operation or instruct the lock module 260 to obtain authorization input. If the latter, then the authorization input is then verified, either by the lock module 260 or the process control module 264, and if verified the process control module 264 allows execution of the requested operation. As discussed above, verification of the authorization input for enabling an otherwise-impermissible operation may result in a one-time permission of the operation, a change to the permitted tasks, or a disabling of the lock state.

Those skilled in the art will also appreciate that a number of the steps described in the foregoing methods may be performed contemporaneously, or in an alternative order, without significantly affecting the operation of the method, depending upon the implementation. Various alternative implementations will be understood by those persons ordinarily skilled in the field of computer programming.

The teachings of the present application may be embodied in other specific forms without departing from the spirit or essential characteristics thereof. Certain adaptations and modifications will be obvious to those skilled in the art. The above discussed embodiments are considered to be illustrative and not restrictive.

What is claimed is:

1. A method of securing an electronic device, the device having an operating system, a task changer and a plurality of running tasks in a background, the method comprising:
   receiving a lock request to lock the device;
   setting a lock indicator in response to the lock request;
   associating permitted task information with the lock indicator of the device;
   receiving a request to activate a selected task from the plurality of running tasks in the background; and
   reading said permitted task information and determining whether said selected task is permitted based upon said permitted task information and, if so, activating said selected task from the background to a foreground.

2. The method claimed in claim 1, wherein, if said determining determines that said selected task is not permitted, then invoking an authorization process to receive verification input, verifying said verification input, and, if verified, activating said selected task.

3. The method claimed in claim 1, further including calling a task change application programming interface (API) without an authorization argument, and generating a call failure in response to said task change API if said device is identified as being in a locked state, and wherein said verifying includes calling said task change API with said verification input as said authorization argument, and validating said verification input.

4. The method claimed in claim 3, wherein said task change API includes a task argument, said task argument indicating said selected task.

5. The method claimed in claim 3, wherein said task change API is selected from a group consisting of an active window change API, a window resizing API, a window minimizing API, a window launch API, and an application launch API.

6. The method claimed in claim 1, wherein said associating includes designating a user profile, said user profile being associated with said permitted task information.

7. The method claimed in claim 6, wherein said designating said user profile includes selecting said user profile from a plurality of user profiles, each of said user profiles having associated permitted task information.

8. The method claimed in claim 1, wherein said associating said permitted task information with said lock indicator includes selecting one or more tasks from a list of available tasks.

9. The method claimed in claim 1, wherein said permitted task information includes information identifying permitted tasks engageable while said device is locked.

10. The method claimed in claim 1, wherein said determining is performed at an operating system level.

11. An electronic device, the device having a locked state and an unlocked state, the device comprising:
  a main body housing a user input device, a display, memory, and a processor operatively coupled to said user input device, said display and said memory;
  an operating system running on said processor for managing input and output through said user input device and said display and providing a platform for operation of application programs, wherein said operating system is configured to receive a request to change to a selected task from a plurality of running tasks in a background;
  a locking component for receiving a lock request to lock the device, setting a lock indicator, and associating permitted task information with the lock indicator of the device; and
  a task request component for identifying that the device is in the locked state based on the lock indicator and for determining whether said selected task is permitted based upon the permitted task information and, if so, activating said selected task from the background to a foreground.

12. The electronic device claimed in claim 11, wherein said locking component is configured to invoke an authorization process to receive input if said task request component determines that said selected task is not permitted, verify said input, and, if verified, activate said selected task.

13. The electronic device claimed in claim 11, wherein said task request component includes a process control layer for receiving said called task change API and, if the device is in the locked state, determining whether said permitted task information includes said selected task and, if not, sending said locking component a failure message in response to the task change API.

14. The electronic device claimed in claim 13, wherein said locking component is configured to launch an authorization process to receive input and call a further task change API, wherein said further task change API includes said input as an argument, and wherein said process control layer verifies said argument and passes said further task change API to said operating system for implementation if said argument is verified.

15. The electronic device claimed in claim 13, wherein said task change API is selected from a group consisting of an active window change API, a window resizing API, a window minimizing API, a window launch API, and an application launch API.

16. The electronic device claimed in claim 11, wherein said memory stores a plurality of user profiles, each user profile having an associated set of permitted tasks, and wherein said locking component is configured to associate the locked state with said permitted task information in response to selection of one of said user profiles.

17. The electronic device claimed in claim 11, wherein said locking component includes a component for receiving a selection of one or more tasks from a list of available tasks as permitted or impermissible tasks, and wherein said permitted task information comprises said selected tasks.

18. The electronic device claimed in claim 11, wherein said task request component is implemented within said operating system.

19. A computer program product for securing an electronic device, the computer program product comprising a non-transitory computer-readable medium having recorded thereon computer-executable instructions, said electronic device having an operating system, a task changer and a plurality of running tasks in a background, said computer-executable instructions comprising:
  computer-executable instructions for receiving a lock request to lock the device;
  computer-executable instructions for setting a lock indicator in response to the lock request;
  computer-executable instructions for associating permitted task information with the lock indicator of the device,
  computer-executable instructions for receiving a request to activate a selected task from the plurality of running tasks in the background; and
  computer-executable instructions for reading said permitted task information and determining whether said selected task is permitted based upon said permitted task information and, if so, activating said selected task from the background to a foreground.

20. The computer program product claimed in claim 19, wherein, if said computer-executable instructions for determining determine that said selected task is not permitted, then further computer-executable instructions invoke an authorization process to receive a verification input, verify said verification input, and, if verified, activate said selected task.

21. The computer program product claimed in claim 19, further including computer-executable instructions for calling a task change application programming interface (API) without an authorization argument, and computer-executable instructions for generating a call failure in response to said task change API if said device is identified as being in a locked state, and wherein said computer-executable instructions for verifying include computer-executable instructions for calling said task change API with said verification input as said authorization argument, and validating said verification input.

22. The computer program product claimed in claim 21, wherein said task change API includes a task argument, said task argument indicating said selected task.

23. The computer program product claimed in claim 21, wherein said task change API is selected from a group consisting of an active window change API, a window resizing API, a window minimizing API, a window launch API, and an application launch API.

24. The computer program product claimed in claim 19, wherein said computer-executable instructions for associating include computer-executable instructions for designating a user profile, said user profile being associated with said permitted task information.

25. The computer program product claimed in claim 24, wherein said computer-executable instructions for designating said user profile include computer-executable instructions for selecting said user profile from a plurality of user profiles, each of said user profiles having associated permitted task information.

26. The computer program product claimed in claim 19, wherein said computer-executable instructions for associating said permitted task information with said lock indicator include computer-executable instructions for selecting one or more tasks from a list of available tasks.

27. The computer program product claimed in claim 19, wherein said permitted task information includes information identifying permitted tasks engageable while said device is locked.

28. The computer program product claimed in claim 19, wherein said computer-executable instructions for determining is implemented at an operating system level.

* * * * *